Feb. 5, 1957   W. HERBRICH   2,780,173
DEVICES FOR REGULATING THE DELIVERY OF PISTON PUMPS
Filed June 26, 1953
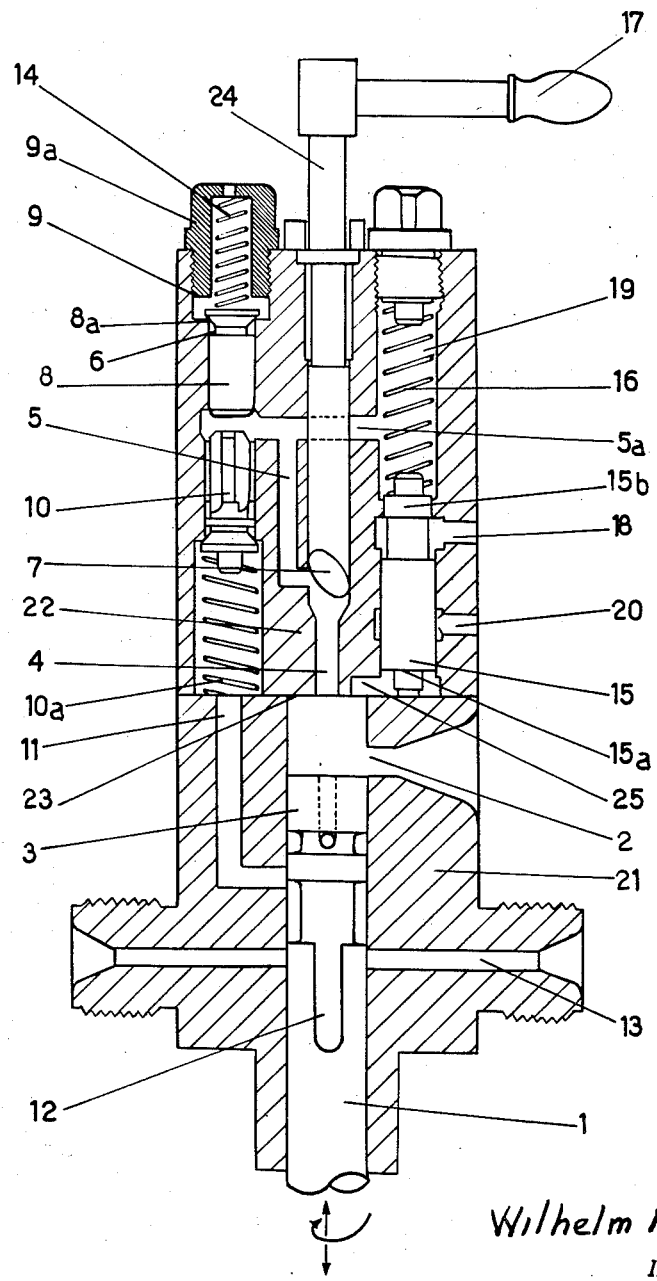
Wilhelm HERBRICH
INVENTOR.
BY
Attorney United States Patent Office 2,780,173
Patented Feb. 5, 1957

2,780,173
DEVICES FOR REGULATING THE DELIVERY OF PISTON PUMPS

Wilhelm Herbrich, Milan, Italy, assignor to Spica S. p. A., Milan, Italy, an Italian company Application June 26, 1953, Serial No. 364,440

Claims priority, application Italy June 27, 1952

5 Claims. (Cl. 103—41)

This invention relates to improvements in devices for regulating the delivery of piston pumps adapted for use as injectors for the cylinders of internal combustion engines.

An object of this invention is to provide a hydraulic regulating system used in connection with a piston pump, to adjust automatically the delivery of the pump as a function of the number of revolutions of the pump shaft.

Another object of the invention is to increase the range of the regulating device by using, in connection with said pump, a throttled passage having a controllable aperture for delivery of the fluid and cooperating with a regulating member consisting of a piston or plunger acted upon on one face by a constant load spring.

Another object of this invention is to eliminate the formation of vapor-lock by avoiding the immediate return of the regulating fluid into the pumping cycle at the end of each pumping delivery stroke.

A further object of this invention is to eliminate the sluggishness of the regulation, due to inertia of the regulating member, by providing an accumulator inserted in the circuit beyond the regulating member and adapted to accumulate during the beginning of each delivery stroke of the pump a quantity of liquid. The delivery proper begins only after the filling of the accumulator has been completed. During the filling period of said accumulator, the regulating member assumes normal operating position, prior to the beginning of the delivery proper towards the injection piping.

Other objects and features will appear from the following description and from the drawing, in which the single figure illustrates, partly in cross-section, a pump provided with the hydraulic regulating system object of the invention.

It has been known to use as regulating means in hydraulic regulating systems, the pressure drop due to the passage of a fluid through an orifice; there, the regulator may be a piston acted upon on one face by the fluid pressure ahead of the orifice and on the other face by the fluid pressure beyond the orifice, said other face cooperating with a spring; when the pressure drop through the orifice overcomes the load of the spring, the piston, or plunger, moves and opens a channel through which fluid is drawn from the pumping cycle to be used to regulate the pump delivery. However, in such prior structures, the orifice has a constant cross-section, while the cooperating spring has a variable load; this prior combination allows only a very narrow regulating range, since the characteristics of the spring are a function of the square of the increase in the number of the pump strokes or revolutions.

In known prior systems, the liquid drawn into the regulator is returned to the pumping cycle; this, particularly with injection pumps, involves the danger of vapor-lock; this is obviated in this invention by sending the liquid drawn by the regulator into a channel separate from the pump cylinder. The sluggishness of the regulation of the prior systems, due to inertia and other defects, are overcome in this invention by the provision of an accumulator inserted in the circuit beyond the regulating member.

The hydraulic system of this invention comprises two groups of elements (a) pumping element with regulating system and accumulator, (b) injection piping, distributor and injectors; between these two groups there is inserted a delivery valve so disposed that, in the rest period between two successive injections, the pressure in group (a) can be adjusted independently of the regulating system, while the residual pressure in group (b) can be maintained at the value required by the characteristics of the engine.

Referring to the drawing, 1 designates the piston of an injection pump; this piston moves axially in the chassis 21, and may also rotate when used in connection with multi-cylinder engines; piston 1 is provided with an upper collar 3; an inlet and outlet orifice 2 is provided in chassis 21, and is so located with respect to collar 3 that the latter, during the axial displacement of piston 1, may close or open orifice 2; the volume of flow through said orifice 2 is a function of the diameters of the piston and of the orifice, and of the height of collar 3, according to known mechanical laws.

The upper part 22 of the chassis has a lower face 23 which forms a stop for the inward motion of piston 1; a channel 4, coaxial with said piston, is provided at the bottom of said part 22; the upper part of said channel 4 forms a means to control the opening of a superimposed valve 7, actuated by coaxial shaft 24 and lever 17 connected thereto.

The accumulator system and delivery system comprise the following elements: disposed in the upper part of the chassis and preferably along an axis parallel to that of piston 1: a chamber 6, a plunger 8 adapted to move axially in chamber 6 and to abut alternatively a lower seat 8a and an upper stop formed by abutment 9 in a cap 9a fixedly connected to the chassis; a spring 14 located within said cap, and adapted to control the displacement of the plunger 8. Below the plunger 8, there is a pressure valve 10 cooperating with spring 10a; when plunger 8 is in its raised position, the lower part of chamber 6 forms an accumulating chamber which communicates with channel 4 through duct 5 and valve 7; when opened, valve 10 communicates with the injectors through ducts 11, 13 and through an internal duct 12 of the pump piston 1.

The regulating element comprises a plunger 15 adapted to move axially in a chamber 19; a spring 16 is located within said chamber 19 and the upper end face of said plunger 15 abuts the lower end of said spring; the regulating element proper, plunger 15, is subjected on its lower face 15a to the full fluid pressure of the piston, communicated through duct 25, and on its upper end 15b to a resultant pressure equal to the load of the spring 16 augmented by the residual pressure from pump 1, after passage of the fluid through valve 7, dependent upon the degree of throttling of said valve 7.

Chamber 19 and plunger 15 cooperate with openings 18 and 20 in the chassis; these openings 18 and 20 are controlled by the displacement of plunger 15; they are so located with respect to plunger 15 that opening 18, which serves as a discharge, opens first in communication with chamber 19 as plunger 15 is lifted; and that channel or opening 20, which serves as a safety outlet, and which is located below opening 18 with respect to spring 16, opens last, as more fully described hereafter.

Combination and communication between channels 4 and 5 and chamber 19 is obtained by means of a duct 5a.

The operation of this device may be illustrated by the following:

(1) On maximum flow, the liquid pumped by piston 1 flows through channel 4, valve 7, which is wide open, channel 5; it reaches accumulator space 6, and, under the influence of pressure, plunger 8 rises until it abuts abutment 9; then valve 10 opens and the fluid flows towards the injectors, as illlustrated herein by ducts 11, 12 and 13. Upon completion of the delivery stroke of piston 1 and retraction of the latter, collar 3 uncovers orifice 2, which permits the discharge of the fluid therethrough, because the pressure is substantially equalized throughout the system; at the same time, plunger 8, under the action of spring 14 and of the aspiration of the pumping element, returns to its original position for discharge to the interior of the pump, and valve 10 closes.

(2) On reduced flow, the principle of the operation is the same as on maximum flow, except that valve 7 is throttled down, and the regulating system operates. The pressure differential due to the throttling of valve 7 is a function of the speed of flow of the liquid through the valve, and therefore of the operating speed of the pumping element and of the engine. For every degree of throttling of valve 7, there corresponds an operating speed of the pumping element for which the differential pressures, acting on the two end faces of plunger 15, overcome the load of spring 16; this causes plunger 15 to rise, allowing passage of the liquid from chamber 19 to discharge opening 18. After the start of the discharge of liquid from chamber 19, the pressure differential acting on plunger 15 increases gradually, causing further rise of the plunger until the passage from chamber 19 to outlet 18 is wide open, which allows the evacuation of the part of the system beyond valve 7; then plunger 8 returns to its initial position, valve 10 closes and the delivery ends.

During the beginning of each delivery stroke of piston 1, the liquid passing through valve 7 fills firstly the accumulator chamber, and plunger 8 rises until it abuts abutment 9. When the accumulator is filled, then valve 10 opens, and the delivery proper toward duct 11 begins. During the time of passage of the quantity of liquid filling the accumulator chamber through valve 7, the regulating plunger 15 comes to its normal operating position.

Thus, at the end of the delivery stroke and during retraction of piston 1, plunger 15 returns to its initial position under the action of spring 19 and of the aspiration through passage 25.

(3) To stop delivery in case of emergency, for instance when the pressure in the pumping element becomes too great as a result of excessive throttling or complete closure of valve 7, outlet 20 is provided; it is apparent that in such case, the pressure in the pumping element, communicated to the under face 15a of plunger 15 through channel 25, will lift the said plunger against the resistance of spring 16 to the maximum extent, so as to uncover outlet 20 to relieve the pressure in the pump.

What I claim is:

1. A regulating system for the delivery of injection piston pumps for internal combustion engines, comprising in combination: a chassis; a piston reciprocable axially in said chassis; an operating chamber in said chassis at the forefront of said piston; an inlet and outlet orifice opening through said chassis into said operating chamber and adapted to be opened and closed alternately by the displacement of said piston; a passageway opening into said operating chamber and adapted to receive the total flow of liquid moved by the piston; a throttle valve in said passageway; means connected to said throttle valve to adjust the opening of said throttle valve during operation; a discharge conduit from said throttle valve; said throttle valve being adapted to control the relative pressures in said operating chamber and passageway and in said discharge conduit; a regulator plunger valve in a regulator chamber; a high pressure duct between said passageway and said regulator chamber, and opening into said regulator chamber below a first end face of said regulator plunger valve; a low pressure duct between said discharge conduit and said regulator chamber, and opening into said regulator chamber above the second end face of said regulator plunger valve; in said regulator chamber, a constant load spring cooperating with said second end face of said regulator plunger valve; whereby the degree of opening of said throttle valve and the resultant difference of pressures between said passageway and said discharge conduit control the displacement of said regulator plunger valve; a low pressure secondary outlet, separate from said inlet and outlet orifice, communicating with said regulator chamber and adapted to be opened and closed alternately by the displacement of said regulator plunger valve, and further adapted to discharge from said regulating system a portion of the flow of liquid moved by said piston, when said throttle valve is partly closed; an accumulator chamber communicating with said discharge conduit, the inner walls of said accumulator chamber forming two spaced abutments; an accumulating plunger axially movable in said accumulator chamber between said spaced abutments; flange means on said accumulating plunger adapted to register with said spaced abutments, whereby the maximum axial displacement of said accumulating plunger corresponds to the axial distance between said abutments.

2. A regulating system as claimed in claim 1, further comprising means to adjust the axial distance between said abutments.

3. A regulating system as claimed in claim 1, further comprising a first extension duct between said discharge conduit and said accumulator chamber; and in which said accumulating plunger is adapted to receive a portion of the flow from said discharge conduit, and to return said portion through said discharge conduit and said operating chamber upon completion of the delivery stroke of said piston, when said throttle valve is wide open.

4. A regulating system as claimed in claim 1, further comprising a second extension duct between said accumulator chamber and said low pressure duct; and in which said accumulating plunger is adapted to receive a portion of the flow from said discharge conduit, and, upon completion of the delivery stroke of said piston and when said throttle valve is partly closed, to direct said portion through said second extension duct, through said low pressure duct and said regulator chamber and through said low pressure secondary outlet.

5. A regulating system as claimed in claim 1, further comprising: a safety outlet opening into said regulator chamber and disposed between said high pressure duct and said low pressure secondary outlet, and adapted to communicate with said high pressure duct through said regulator chamber under the first end face of said regulator plunger valve, upon substantially full lifting of the latter valve against the resistance of said constant load spring, when said throttle valve is excessively or totally closed.

References Cited in the file of this patent

UNITED STATES PATENTS

| | | |
|---|---|---|
| 2,173,813 | Bischof | Sept. 19, 1939 |
| 2,270,127 | Kravits | Jan. 13, 1942 |
| 2,296,357 | Links | Sept. 22, 1942 |
| 2,582,539 | Grimod | Jan. 15, 1952 |

FOREIGN PATENTS

| | | |
|---|---|---|
| 523,163 | Great Britain | July 8, 1940 |